US006684286B1

(12) United States Patent
Terasima (10) Patent No.: US 6,684,286 B1
(45) Date of Patent: Jan. 27, 2004

(54) HIGH-SPEED BLOCK TRANSFER CIRCUIT (75) Inventor: Kazuaki Terasima, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 531 days.

(21) Appl. No.: 09/704,719

(22) Filed: Nov. 3, 2000

(30) Foreign Application Priority Data

Jan. 21, 2000 (JP) ........................................ 2000-012781

(51) Int. Cl.[7] .......................... G06F 13/40; G06F 13/14; G06F 13/00
(52) U.S. Cl. ........................ 710/307; 710/305; 710/100
(58) Field of Search ................. 710/307, 305, 710/100

(56) References Cited

U.S. PATENT DOCUMENTS

| 5,423,009 A | * | 6/1995 | Zhu ............................ 710/307 |
| 5,761,456 A | * | 6/1998 | Titus et al. .................. 710/305 |
| 6,047,348 A | * | 4/2000 | Lentz et al. ................. 710/307 |
| 6,101,567 A | * | 8/2000 | Kim et al. ................... 710/305 |
| 6,381,664 B1 | * | 4/2002 | Nishtala et al. ............. 710/305 |
| 6,434,654 B1 | * | 8/2002 | Story et al. ................. 710/307 |

FOREIGN PATENT DOCUMENTS

JP  5-204836 A  8/1993

* cited by examiner

*Primary Examiner*—Tim Vo
(74) *Attorney, Agent, or Firm*—Leydig, Voit & Mayer, Ltd.

(57) ABSTRACT

A high-speed block transfer circuit includes a processing unit that can carry out dummy symbol processing using a CPU block transfer instruction based on a condition discriminant "$DE \leq HL+(y-x)$ [byte] ($x \neq y$)" where "HL" represents an initial address of a block transfer origin, "DE" represents an initial address of a block transfer destination, "x [byte]" represents a block transfer data fixed length of an original instruction, and "y [byte]" represents a corresponding bus sizing length.

9 Claims, 12 Drawing Sheets

HIGH-SPEED BLOCK TRANSFER CIRCUIT

FIELD OF THE INVENTION

The present invention relates to a high-speed block transfer circuit in dynamic bus sizing. Particularly, this invention relates to a high-speed block transfer circuit in dynamic bus sizing that is used in the CPU of a system having a high-speed external access based on an expanded bus width without changing an instruction set architecture as a design asset.

BACKGROUND OF THE INVENTION

In general, a CPU controls a system as a whole. Further, the CPU exchanges data with other devices like memories and I/O units.

Therefore, if a high-speed CPU is used it is possible to improve the performance of the whole system.

Figure 10:
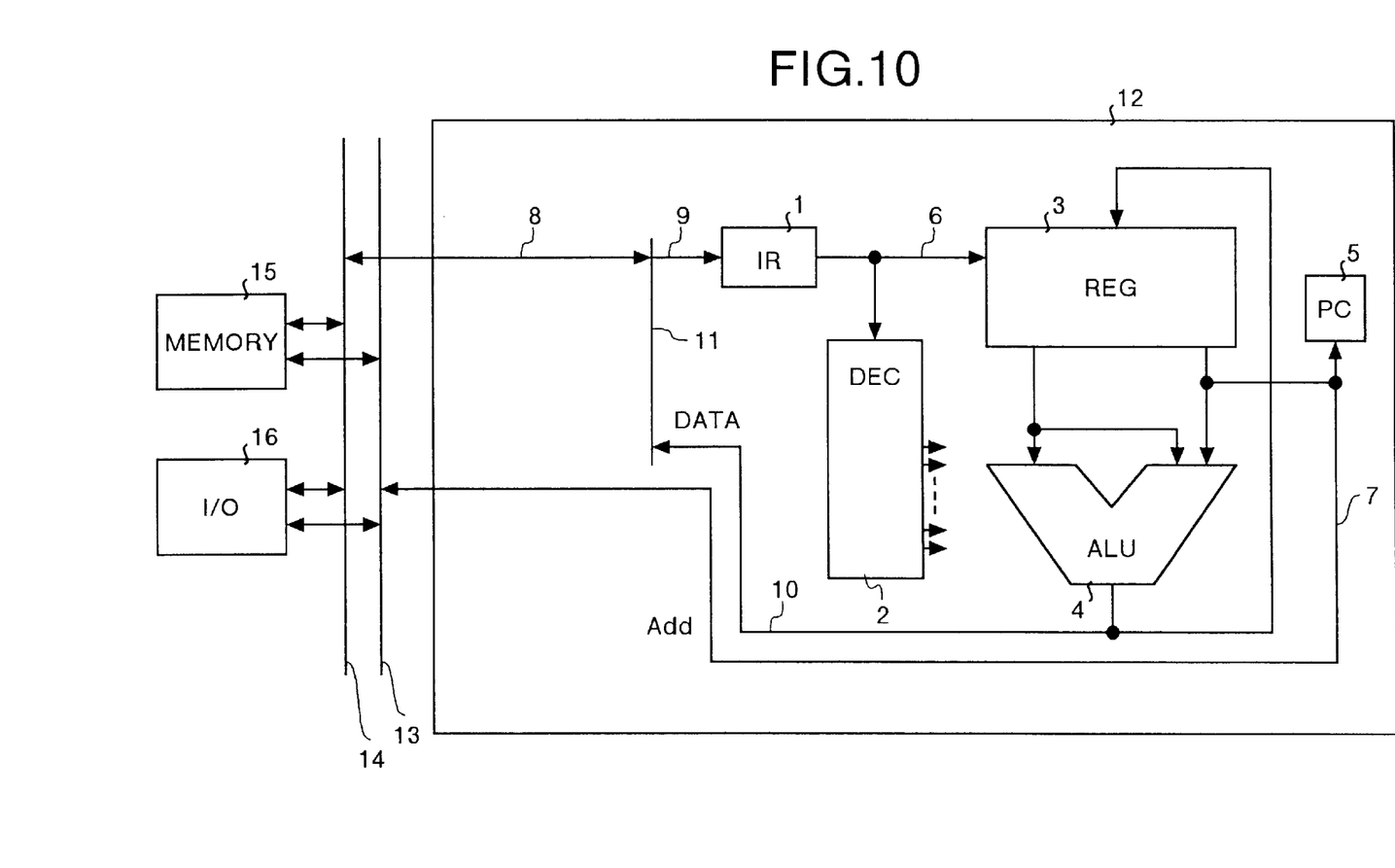
FIG. 10 is a block diagram showing an overall structure of an ordinary CPU according to a prior-art technique.

In order to meet this requirement, a structure as shown in FIG. 10 has so far been proposed.

Legend 1 denotes a group of instruction registers IR which store instructions. Legend 2 denotes a decoder DEC which decodes the instructions issued from the IR 1 and generates internal control signals and internal data. Legend 3 denotes a group of register files REG that store the internal data. Legend 4 denotes an arithmetic logical unit ALU which performs arithmetic operation based on data received from the decoder DEC 2 and the register group REG 3. Legend 5 denotes a programmable counter PC which displays an address of an instruction currently under execution.

Legend 6 denotes a data bus which delivers data to the outside. Legend 7 denotes an address bus for making access to the outside. Legends 8, 9, 10 and 11 denote data buses that are used for receiving data when making access to the outside.

A general function of the CPU is performed based on the above structure.

Legend 13 and 14 denote data address buses for connecting all the above mentioned components to external devices such as a memory 15 and an I/O unit 16.

In general, access time slows in the order of a register within the CPU, a cache memory, an external memory, and an I/O unit.

To overcome this problem, there is a method of improving the processing speed of a system by expanding the width of the external bus, which is a completely different method from the method of improving the speed of the operation frequency of the CPU. By expanding the bus width of the external bus, the bus width after the expansion and the bus width before the expansion, as well as a bus width between these bus sizes, are dynamically changed to make it possible to exchange data at high speed. This method is called dynamic bus sizing.

When the CPU makes access to the memory and the I/O unit, the CPU uses dynamic bus sizing to exchange data between the CPU and these external units at high speed. However, when an instruction code has maintained compatibility only by expanding a bus width without changing the instruction set architecture of the CPU, it is also necessary to succeed an existing program.

Because of this background, a CPU that can process dynamic bus sizing tends to implement the instruction set in complete compatibility with the system before the expansion of the bus width or in compatibility with the system at a higher level.

This method has following drawbacks in relation to dynamic bus sizing.

Figure 11:
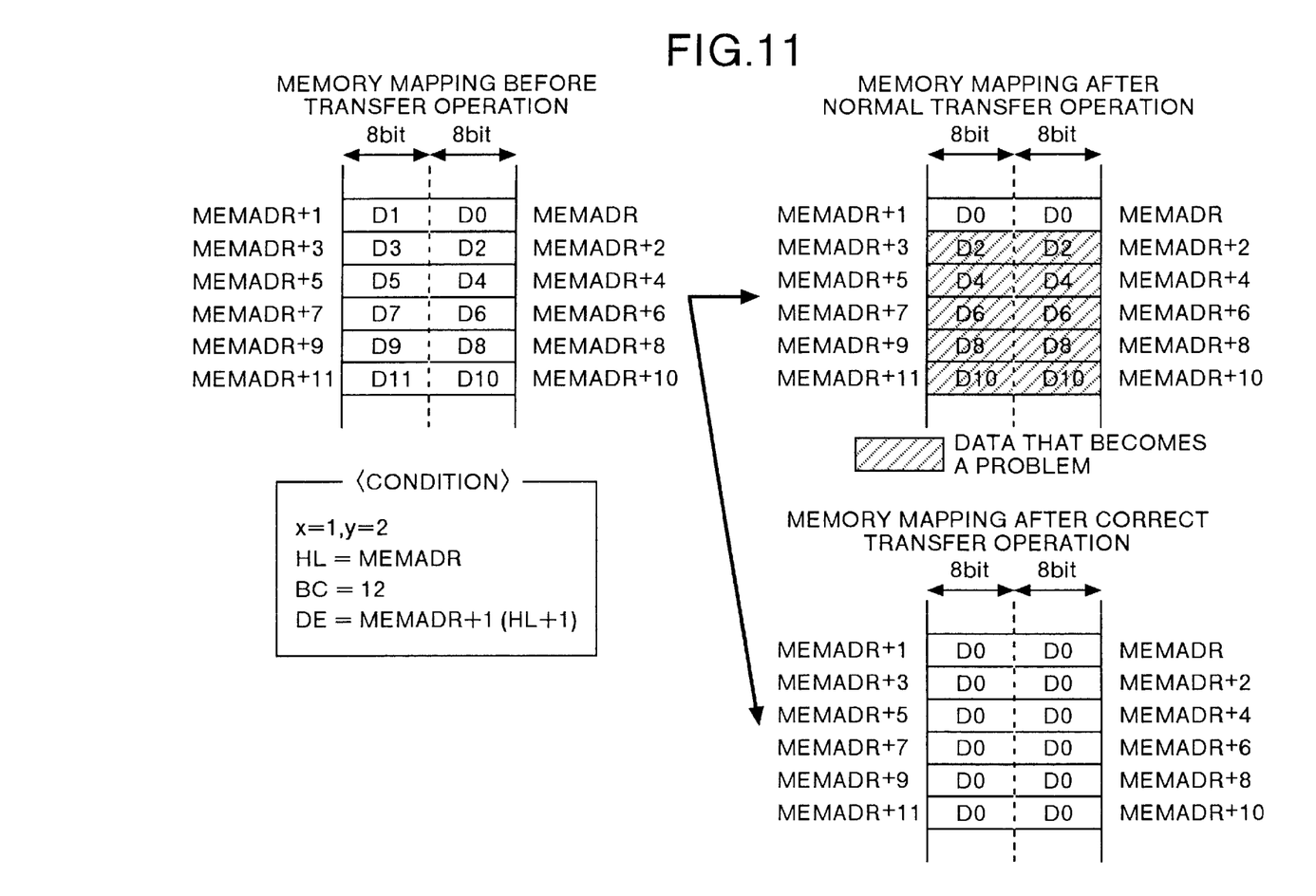
FIG. 11 is an explanatory diagram showing an example of a problem according to the prior-art technique.

FIG. 11 shows a comparison of transfers carried out using a CPU block transfer instruction. A, a CPU adapted to dynamic bus sizing in complete compatibility with the system based on the bus width expansion or in compatibility with the system at a higher level does not carry out dynamic bus sizing but carries out only transfer processing of a block transfer having the fixed data length of the original instruction.

Figure 12:
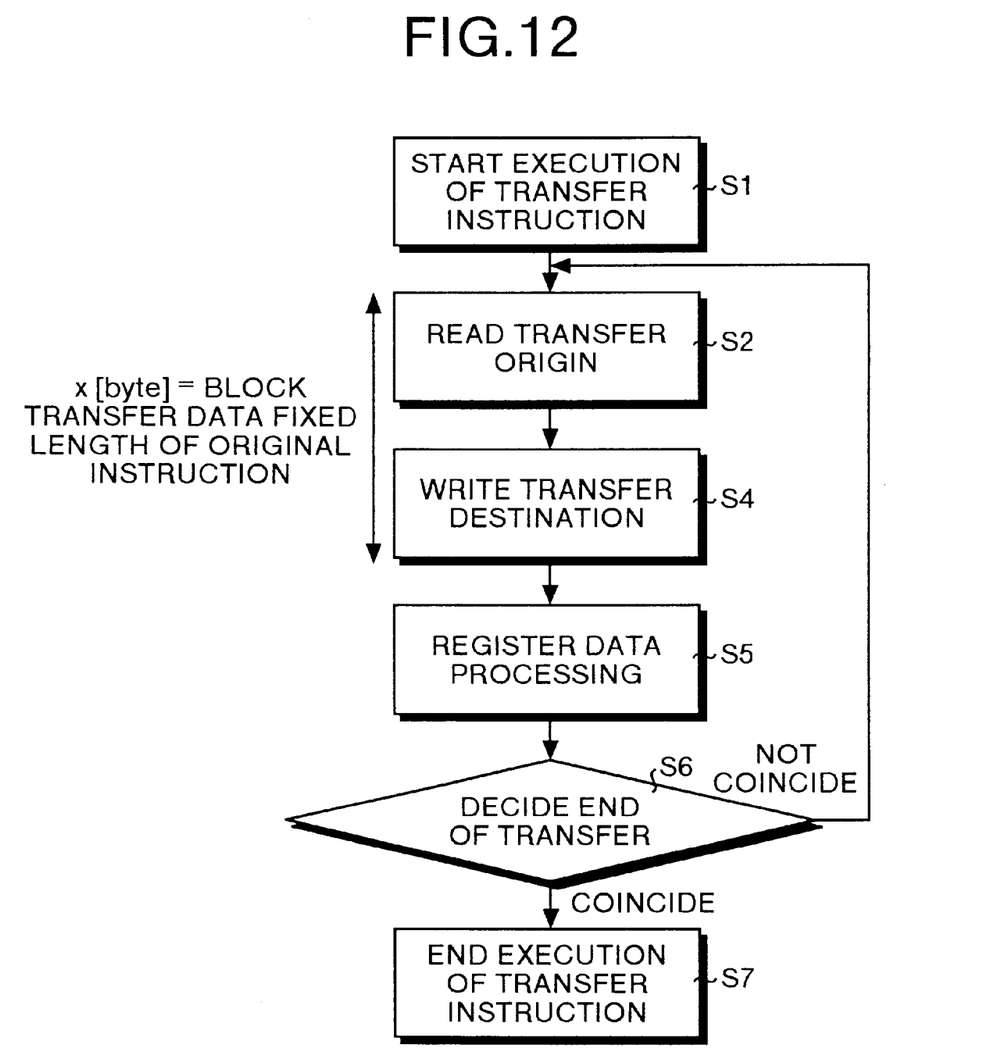
FIG. 12 is a flowchart showing a sequence for executing a block transfer instruction according to the prior-art technique.

FIG. 12 shows the operation sequence of the CPU. After an instruction has been decoded, the execution of a transfer instruction is started at step S1. Then, a transfer origin is read at step S2, a transfer destination is written at step S4. A register data processing is carried out at step S5, and a transfer end decision is made at step S6. Following this decision, whether a transfer is to be continued or not is decided.

When it has been decided that a transfer is to be continued, the process returns to step S2 and the transfer origin is read again. When it has been decided that the transfer has been completed, the execution of the transfer instruction is ended at step S7.

At step S2 and step S4, data transfer is carried out in the transfer data fixed length of the original instruction.

Usually, a block transfer data fixed length of the original instruction is shorter than a data length corresponding to dynamic bus sizing. Therefore, there is a risk that the performance is not improved when the transfer instruction of the CPU is used.

Suppose that an initial address of a block transfer origin is expressed as "HL" an, initial address of a block transfer destination is expressed as "DE", and block transfer length is expressed as "BC", where HL, DE and BC are all positive integers, and that the transfer processing is carried out based on these parameters. Further, suppose that the block transfer data fixed length is expressed as x [byte] and corresponding bus sizing length is expressed as y [byte]. In this case, a problem occurs under a condition of DE≦HL+(y−x) [byte] (x≠y) in a memory space that has been memory-mapped in the fixed data length of the original instruction.

FIG. 11 shows a result of carrying out a data transfer from a 16-bit data memory to a 16-bit data memory by dynamic bus sizing under the condition of DE≦HL+(y−x) [byte] (x≠y) when x=1 and y=2.

Data within the memory after a normal transfer operation is different from data within the memory after a correct transfer operation. This difference occurs because of a problem in dynamic bus sizing under the condition given.

A prior-art technique has been disclosed in Japanese Patent Application Laid-open No. 5-204836. This prior-art technique is similar to the present invention in only the processing during an overlap. The present invention is clearly different from this prior-art technique in that the present invention includes processing of dynamic bus sizing and pipeline processing of the CPU.

SUMMARY OF THE INVENTION

It is an object of the present invention to provide a high-speed block transfer circuit in dynamic bus sizing that makes it possible to carry out a block transfer in a data length of at least a block transfer data fixed length of an original instruction and that carries out a dynamic bus sizing processing.

In order to achieve the above object, the high-speed block transfer circuit is provided with a processing unit that can carry out a dummy symbol processing by using a CPU block transfer instruction based on a condition discriminant "DE≦HL+(y−x) [byte] (x≠y)" where "HL" represents an initial address of a block transfer origin, "DE" represents an initial address of a block transfer destination, "x [byte]" represents a block transfer data fixed length of an original instruction, and "y [byte]" represents a corresponding bus sizing length.

Other objects and features of this invention will become apparent from the following description with reference to the accompanying drawings.

DESCRIPTION OF THE PREFERRED EMBODIMENTS

A first embodiment of the invention will be explained with reference to FIG. 1 to FIG. 4.

Figure 1:
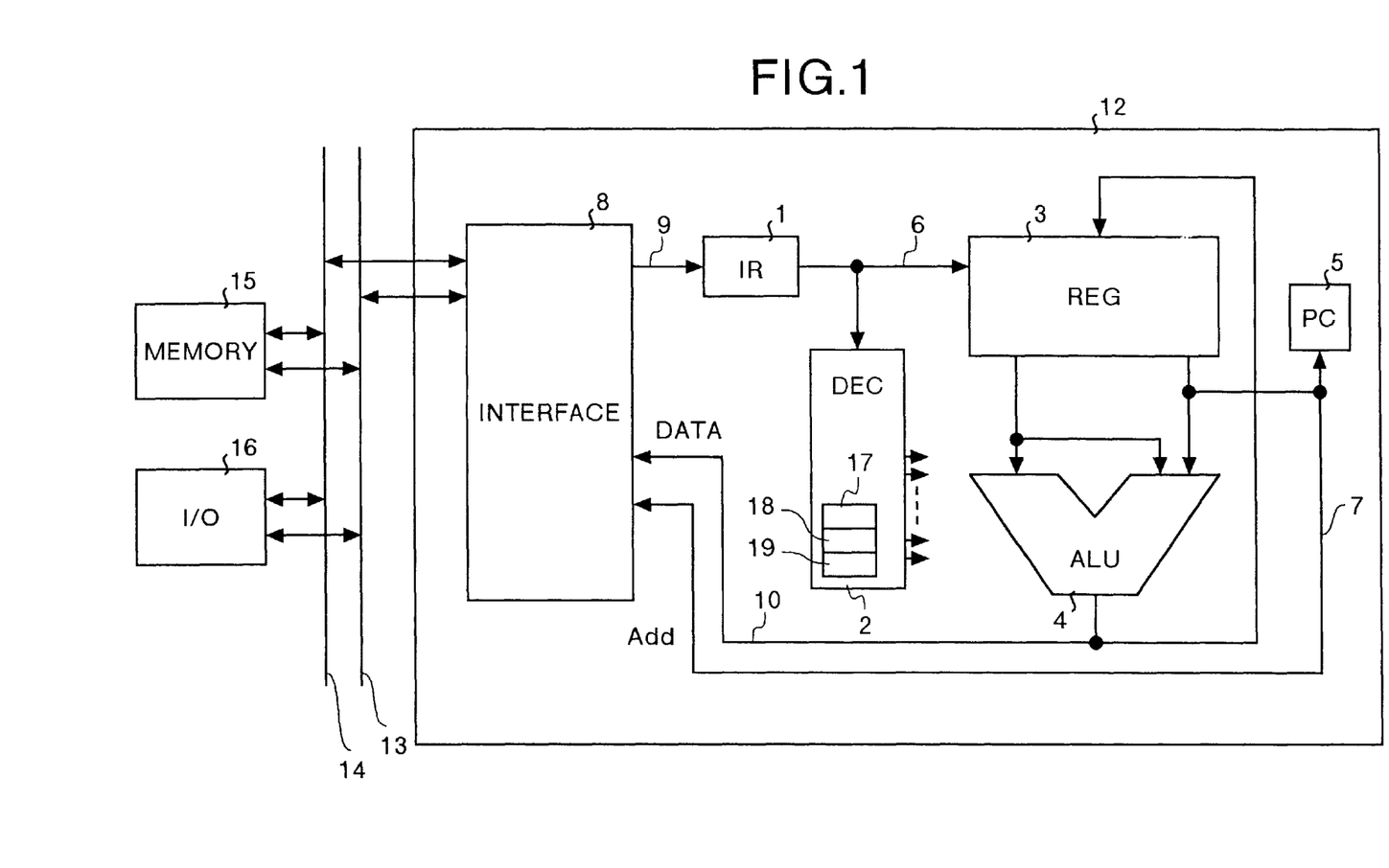
FIG. 1 is a block diagram showing an overall structure of a CPU according to a first embodiment of the present invention.
Figure 2:
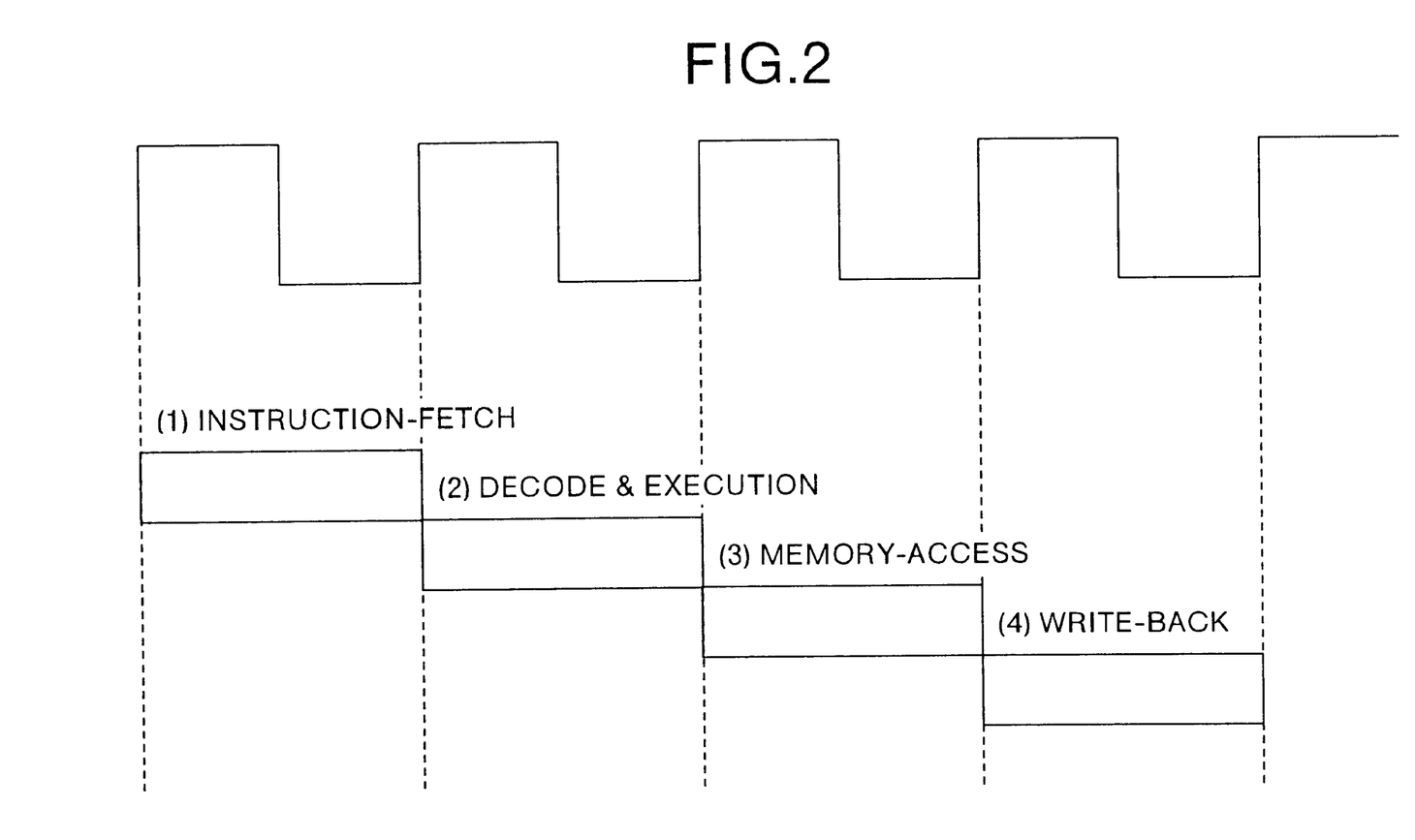
FIG. 2 is waveform diagram showing a clock timing in the CPU having a pipeline structure according to the first embodiment of the invention.
Figure 3:
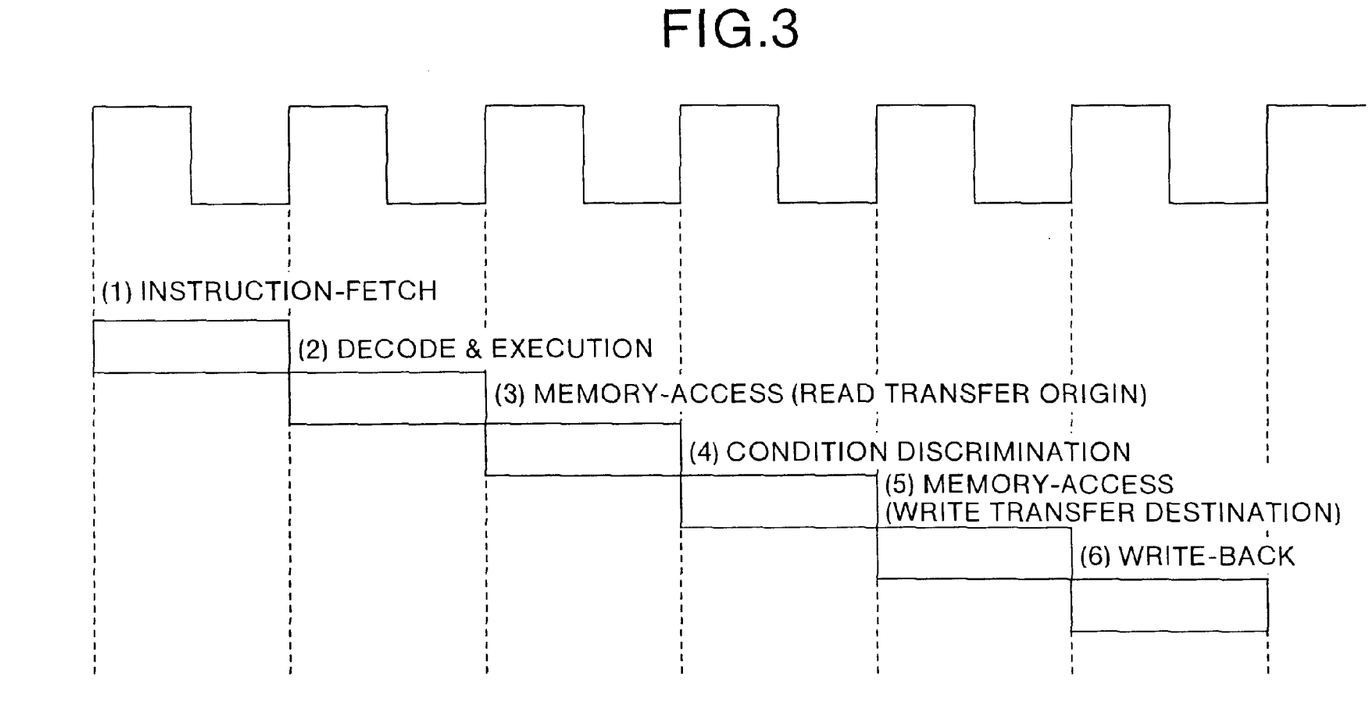
FIG. 3 is a waveform diagram showing a clock time of execution of a block transfer instruction in the CPU having the pipeline structure according to the first embodiment of the invention.
Figure 4:
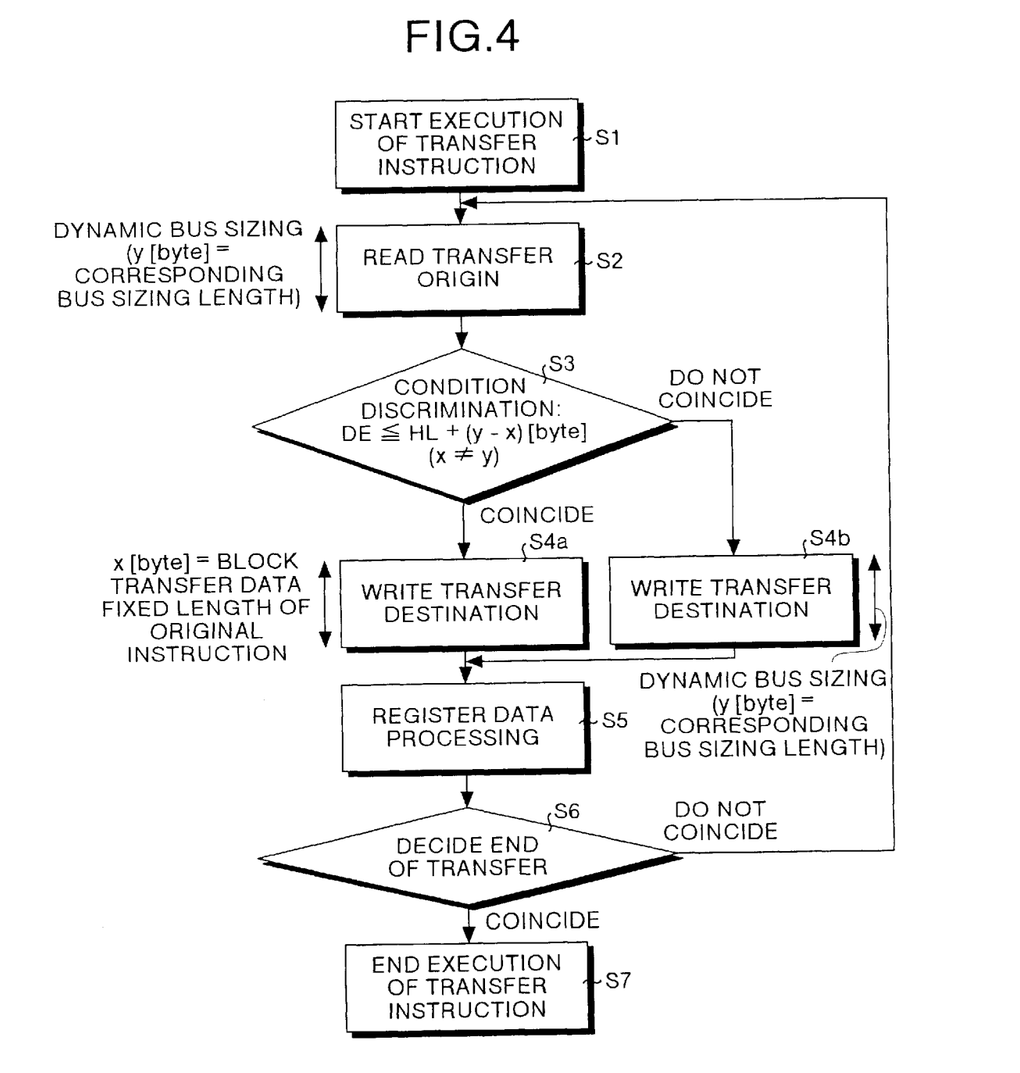
FIG. 4 is a flowchart showing a sequence for executing a block transfer instruction according to the first embodiment of the invention.

FIG. 1 is a block diagram showing an overall structure of a CPU according to a first embodiment of the present invention. FIG. 2 shows the clock time in the CPU having a pipeline structure according to the first embodiment of the invention. FIG. 3 shows the clock time of execution of a block transfer instruction in the CPU having the pipeline structure according to the first embodiment of the invention. FIG. 4 is a flowchart showing a sequence for executing the block transfer instruction according to the first embodiment of the invention.

In FIG. 1, legend 12 denotes a CPU core. Legend 15 denotes an external memory respectively, and I/O 13 and 14 denote an address bus and a data bus as common buses respectively.

Legend 1 denotes a group of instruction registers IR for storing instructions. Legend 2 denotes a decoder DEC for decoding instructions output by the IR 1 and generating internal control signals and internal data. Legend 3 denotes a group of register files REG for storing internal data. Legend 4 denotes an arithmetic logical unit ALU which performs arithmetic operation based on data received from the decoder DEC 2 and the register group REG 3. Legend 5 denotes a programmable counter PC that displays the address of an instruction currently under execution.

Legend 6 denotes a data bus that is used for delivering data to the outside. Legend 7 denotes an internal address bus for making access to the outside. Legend 8 denotes an interface, and legends 9 and 10 denote internal data buses that are used for receiving data when making access to the outside.

Legend 17 denotes a detection circuit which detects a condition. Legend 18 denotes a conversion circuit which converts each information of internal address buss/data bus into information of dynamic bus sizing. Legend 19 denotes a processing circuit for carrying out the dynamic bus sizing processing.

All the functions of the CPU are realized to data from the data buses 9 and 10 based on the above structure.

According to the circuit structure of the first embodiment of the present invention, it is possible to carry out the dynamic bus sizing processing. It is also possible to carry out the dynamic bus sizing processing by using a CPU block transfer instruction in the CPU equipped with an instruction carried out based on the block transfer instruction.

Assume that the initial address of a block transfer origin is expressed as "HL", initial address of a block transfer destination is expressed as "DE", and block transfer length is expressed as "BC", where HL, DE and BC are all positive integers, and the transfer processing is carried out based on the above three parameters. Further, assume that the block transfer data fixed length is expressed as x [byte] and a corresponding bus sizing length is expressed as y [byte]. In this case, a problem occurs under a condition of DE≦HL+(y−x) [byte] (x≠y, BC≧2) in a memory space that has been memory-mapped in the fixed data length of the original instruction.

In the first embodiment, key portions are constructed by the detection circuit 17 that detects this problem (the same function can also be achieved by the arithmetic logical unit 4), the circuit 18 that makes it possible to carry out a processing flow after the detection, and the processing circuit 19 that carries out the dynamic bus sizing processing accordingly.

The detection circuit 17 that detects a condition is constructed by four input operators, and prepares a signal showing a coincidence of a condition.

A condition changes depending on the state of x and y. The signal showing a coincidence of the condition is changed when x=1 and y=2. A discrimination circuit as a discriminating unit that makes it possible to carry out a processing flow after a detection is included in the decoding circuit DEC 2 as a main decoder. A discrimination operation is carried out in the decoding cycle of the CPU.

The processing circuit 19 for carrying out the dynamic bus sizing processing following the above operation consists of a latch circuit as a latch unit that latches data of the block transfer origin, a selection circuit as a selection unit that selects data after the latching, and a circuit for carrying out the dynamic bus sizing processing.

As a general architecture of the CPU, there is a pipeline structure. FIG. 2 shows a relationship between a clock time and execution of the CPU having the pipeline structure.

The CPU of a general pipeline structure reads an instruction from a memory, and stores it into the register group IR 1 (INSTRUCTION-FETCH at step (1) in FIG. 2). The CPU decodes the register group IR 1, and prepares an internal control signal (DECODE & EXECUTION at step (2) in FIG. 2). The CPU then carries out an internal operation and makes an access to the external unit based on this internal control signal (MEMORY ACCESS at step (3) in FIG. 2).

The CPU saves a result of this execution (WRITE BACK at step (4) in FIG. 2). The CPU repeats this operation.

FIG. 3 shows a relationship between a clock time and execution of a block transfer operation.

Based on the above circuit structure, the CPU executes the block transfer operation in the following sequence. First, INSTRUCTION-FETCH is carried out at step (1) in FIG. 3. Next, DECODE is carried out at step (2), MEMORY ACCESS (READ the transfer origin) at step (3), and a condition discrimination is carried out at step (4) in FIG. 3. MEMORY ACCESS (WRITE the transfer origin) is carried out at step (5), and WRITE-BACK is carried out to update data of each register at step (6) in FIG. 3.

The condition discrimination at step (4) is structured by a circuit for discriminating $DE \leq HL+(y-x)$ [byte] $(x \neq y)$ FIG. 4 shows a sequence of the block transfer processing by the CPU.

In FIG. 4, step S1 corresponds to an end time of step (2) in FIG. 3. Step S2 in corresponds to READ the transfer origin at step (3) in FIG. 3. Step S3 corresponds to the condition discrimination at step (4) in FIG. 3. Step S4a and step S4b correspond to WRITE the transfer destination at step (5) in FIG. 3. Step S6 corresponds to WB (the transfer end decision) at step (6) in FIG. 3.

Based on a result of the discrimination of the condition discriminant "$DE \leq HL+(y-x)$" in the flow at step S3 in FIG. 4, the decoder carries out the processing by branching the processing into the dynamic bus sizing processing at the step S4b and the processing in the block transfer data fixed length of the original instruction at step S4a.

This dynamic bus sizing processing is carried out by the processing circuit 19 shown in FIG. 1.

According to the first embodiment, it is possible to carry out the dynamic bus sizing processing when the condition has not been satisfied. Therefore, it is possible to carry out a block transfer depending on the bus width, which improves the performance.

In the first embodiment of the present invention, there is provided a processing unit that can carry out a dynamic bus sizing processing and that can carry out a dummy symbol processing by using a CPU block transfer instruction in a CPU equipped with an instruction to be carried out based on the block transfer instruction. Therefore, it is possible to obtain the high-speed block transfer circuit in dynamic bus sizing that can carry out a block transfer in a data length larger than the block transfer data fixed length of the original instruction and that can carry out the dynamic bus sizing processing.

Further, the processing unit can carry out a dummy symbol processing by using a CPU block transfer instruction based on a condition discriminant "$DE \leq HL+(y-x)$ [byte] $(x \neq y)$" where "HL" represents an initial address of a block transfer origin, "DE" represents an initial address of a block transfer destination, "x [byte]" represents a block transfer data fixed length of an original instruction, and "y [byte]" represents a corresponding bus sizing length. Therefore, based on the processing using the condition discriminant "$DE \leq HL+(y-x)$ [byte] $(x \neq y)$", it is possible to obtain the high-speed block transfer circuit in dynamic bus sizing that can carry out a block transfer in a data length larger than the block transfer data fixed length of the original instruction and that can carry out the dynamic bus sizing processing.

Further, a CPU main decoding circuit has a discrimination circuit of the condition discriminant "$DE \leq HL+(y-x)$ [byte] $(x \neq y)$", and the CPU has a discriminating unit that carries out a discrimination in a CPU decoding cycle. Therefore, it is possible to obtain the high-speed block transfer circuit in dynamic bus sizing that can suitably and easily execute a processing based on the condition discriminant "$DE \leq HL+(y-x)$ [byte] $(x \neq y)$", that can carry out a block transfer in a data length larger than the block transfer data fixed length of the original instruction and that can carry out the dynamic bus sizing processing.

Further, the CPU includes a latching unit consisting of a latch circuit that latches data for the purpose of carrying out a dynamic bus sizing processing and a selecting unit consisting of a selecting circuit that uses latched data based on a result of a discrimination carried out according to the condition discriminant "$DE \leq HL+(y-x)$ [byte] $(x \neq y)$". Therefore, it is possible to obtain the high-speed block transfer circuit in dynamic bus sizing that can suitably and easily execute a processing using the condition discriminant "$DE \leq HL+(y-x)$ [byte] $(x \neq y)$" based on the latching and selection of data, that can carry out a block transfer in a data length larger than the block transfer data fixed length of the original instruction and that can carry out the dynamic bus sizing processing.

Further, the processing unit can carry out data writing in a transfer data length of an original instruction in an execution flow under the condition and that can carry out a processing corresponding to dynamic bus sizing in other execution flows. Therefore, it is possible to obtain the high-speed block transfer circuit in dynamic bus sizing that can suitably carry out a block transfer in a data length larger than the block transfer data fixed length of the original instruction and that can carry out the dynamic bus sizing processing.

Further, the CPU main decoding circuit has a discrimination circuit of the condition discriminant "$DE \leq HL+(y-x)$ [byte] $(x \neq y)$", and the CPU has a discriminating unit that carries out a discrimination in a CPU decoding cycle. Therefore, it is possible to obtain the high-speed block transfer circuit in dynamic bus sizing that can suitably and easily carry out a block transfer in a data length larger than the block transfer data fixed length of the original instruction and that can carry out the dynamic bus sizing processing.

A second embodiment of the present invention will be explained with reference to FIG. 5.

Figure 5:
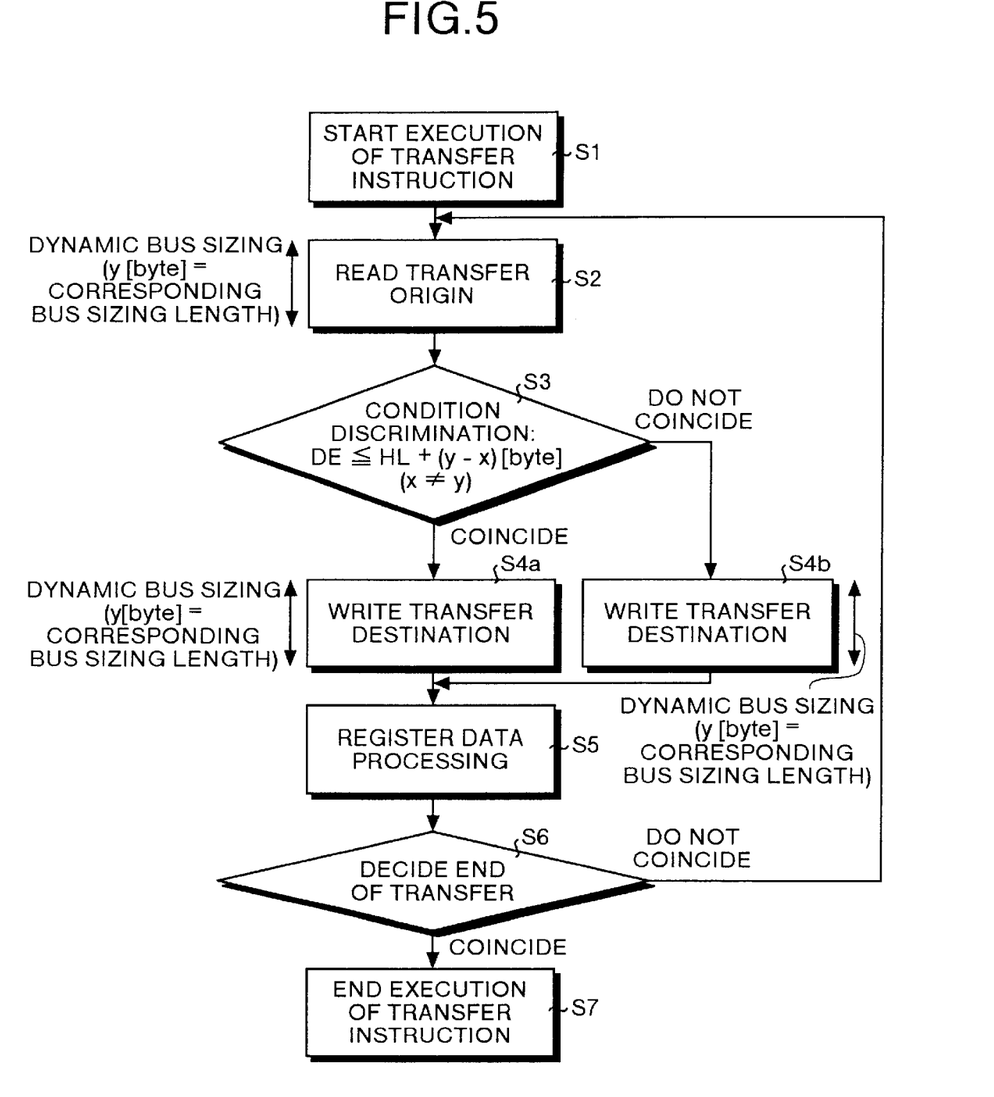
FIG. 5 is a flowchart showing a sequence for executing a block transfer instruction according to a second embodiment of the invention.

FIG. 5 shows a sequence of operations when the block transfer instruction according to a second embodiment of the invention is executed.

According to the second embodiment, the CPU in the first embodiment can execute an 8-bit instruction set, a CISC instruction (from 8 bits to 32 bits), dynamic bus sizing (8 bits, 16 bits) and a transfer instruction LDDR.

FIG. 5 shows an example of a case where data transfer is carried out by the transfer instruction LDDR.

In this case, only "DE=HL+1" meets the condition discriminant "DE≦HL+(y−x) [byte] (x≠y)".

Under this condition, the decoder carries out data write operation in the fixed transfer data length (8 bits) of the original instruction changing from the dynamic bus sizing processing (8 bits or 16 bits) of the normal execution flow.

Under other conditions than the above, the write operation is of course carried out in 8 bits/16 bits by dynamic bus sizing.

According to the second embodiment of the invention, a data transfer is carried out by the transfer instruction LDDR by using the CPU that can execute an 8-bit instruction set, a CISC instruction (from 8 bits to 32 bits), dynamic bus sizing (8 bits, 16 bits) and a transfer instruction LDDR. In carrying out the above operation, there is provided a processing unit that can carry out a dummy symbol processing by using a CPU block transfer instruction based on a condition discriminant "DE≦HL+(y−x) [byte] (x≠y)" where "HL" represents an initial address of a block transfer origin, "DE" represents an initial address of a block transfer destination, "x [byte]" represents a block transfer data fixed length of an original instruction, and "y [byte]" represents a corresponding bus sizing length. Therefore, it is possible to obtain the high-speed block transfer circuit in dynamic bus sizing that can suitably and easily execute a processing using the condition discriminant "DE≦HL+(y−x) [byte] (x≠y)" based on the transfer instruction LDDR, that can carry out a block transfer in a data length larger than the block transfer data fixed length of the original instruction and that can carry out the dynamic bus sizing processing.

A third embodiment of the invention will be explained with reference to FIG. 6.

Figure 6:
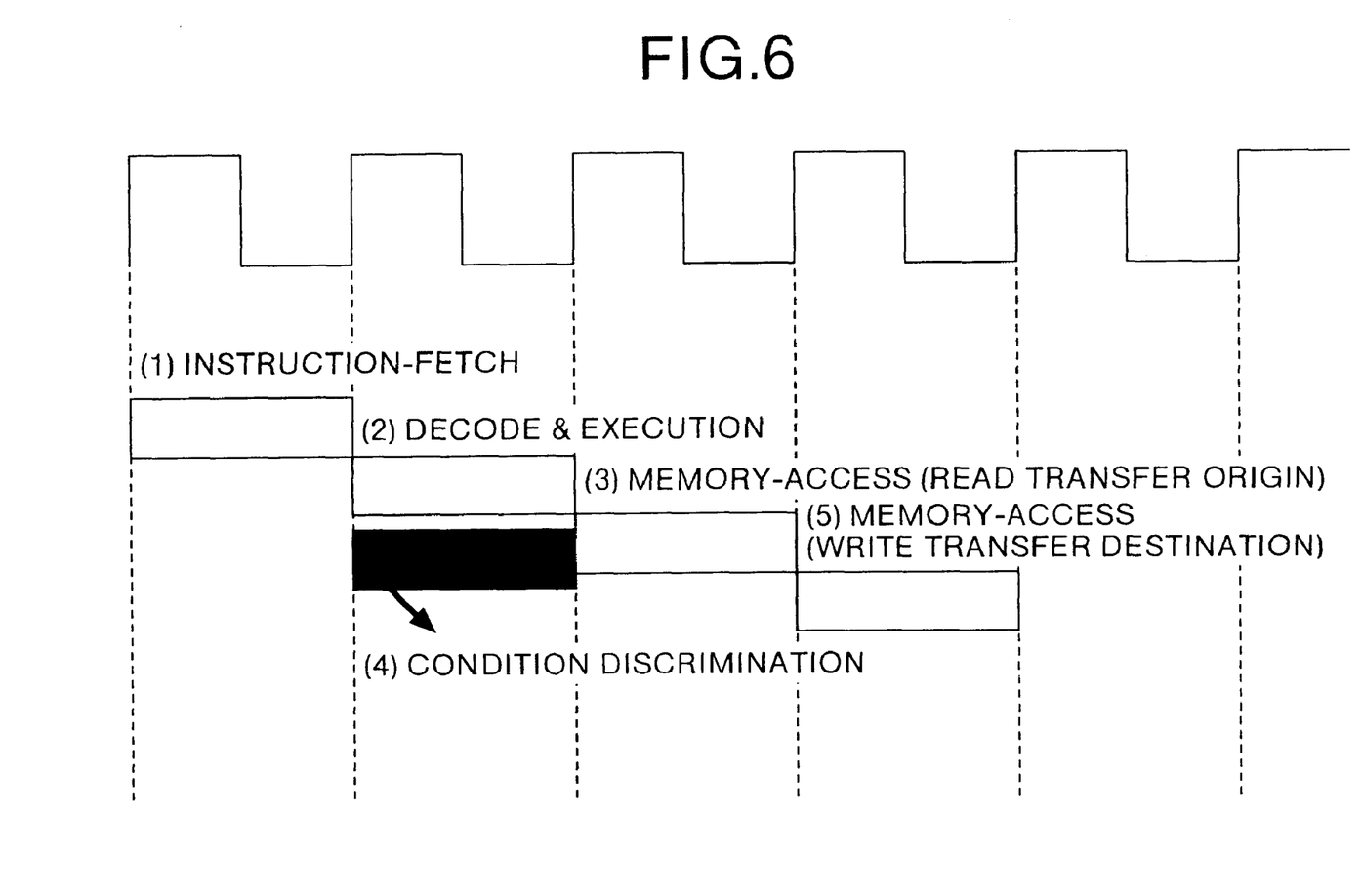
FIG. 6 is a waveform diagram showing a clock time of execution of a block transfer instruction in a CPU having the pipeline structure according to a third embodiment of the invention.

FIG. 6 shows a clock time (a reduction in condition discrimination time) for executing a block transfer instruction in a CPU having a pipeline structure.

According to the third embodiment, the condition discrimination carried out next to the decoding in the execution cycle of the first embodiment shown in FIG. 3 is carried out in parallel with the decoding.

As shown in FIG. 6, condition discrimination at step (4) is carried out in the same machine cycle as the cycle of DECODE at step (2).

An overall structure of the third embodiment is similar to that of the first embodiment shown in FIG. 1, and has a construction of a decoding circuit consisting of circuits for carrying out the parallel processing, and a condition detecting circuit.

The third embodiment consists of circuits similar to those shown in FIG. 1. They include the detection circuit 17 for detecting a condition, the conversion circuit 18 for converting each information of internal address buss/data bus into information of dynamic bus sizing, and the processing circuit 19 for carrying out the dynamic bus sizing processing. Based on the above structure, it is possible to increase the processing speed of the machine cycle by the time taken for the condition discrimination.

In the third embodiment there is provided a processing unit that can carry out a dummy symbol processing by using a CPU block transfer instruction based on a condition discriminant "DE ≦HL+(y−x) [byte] (x≠y)" where "HL" represents an initial address of a block transfer origin, "DE" represents an initial address of a block transfer destination, "x [byte]" represents a block transfer data fixed length of an original instruction, and "y [byte]" represents a corresponding bus sizing length. Further, the condition discrimination is carried out in the same cycle as the decoding. Therefore, it is possible to obtain the high-speed block transfer circuit in dynamic bus sizing that can suitably execute a processing at high speed using the condition discriminant "DE≦HL+ (y−x) [byte] (x≠y)", that can carry out a block transfer in a data length larger than the block transfer data fixed length of the original instruction and that can carry out the dynamic bus sizing processing.

A fourth embodiment of the invention will be explained with reference to FIG. 7.

Figure 7:
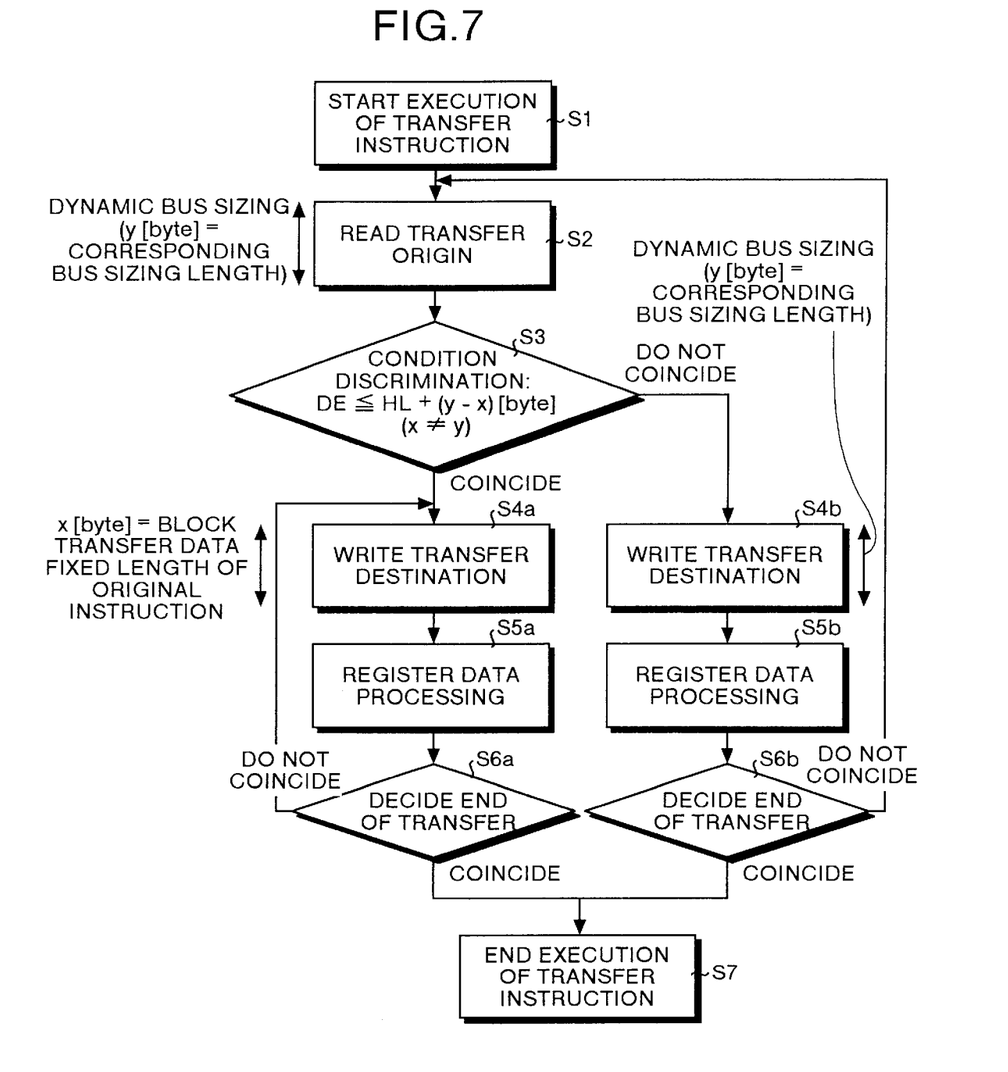
FIG. 7 is a flowchart showing a sequence for executing a block transfer instruction according to a fourth embodiment of the invention.

FIG. 7 shows a sequence of operations when the block transfer instruction is executed.

According to the fourth embodiment, the execution flow that meets the condition discriminant "DE≦HL+(y−x) [byte] (x≠y)" in the first embodiment is carried out in a reduced flow. FIG. 7 shows its sequence.

After a data transfer has been ended in the transfer data fixed length of the original instruction based on the condition discrimination, the step of WRITE the transfer destination is carried out continuously without the process returning to the step of READ the transfer origin.

Figure 8:
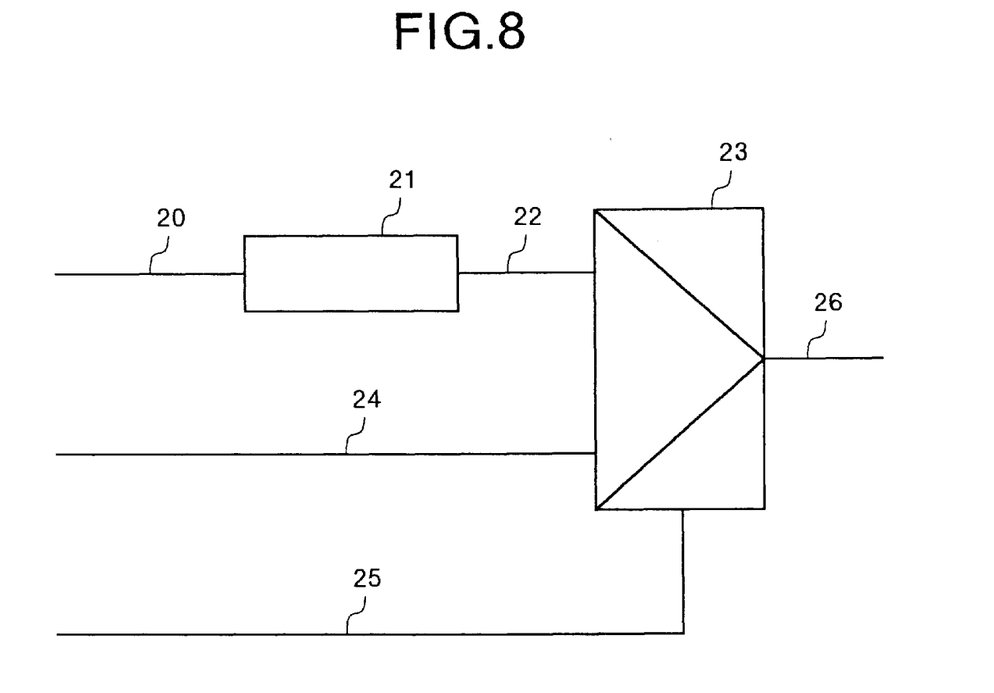
FIG. 8 is a connection diagram showing a structure including a latch circuit and a selection circuit according to a fifth embodiment of the invention.

In this case, an output of the latch circuit 2 shown in FIG. 8 (refer to the fifth embodiment) is used to carry out the write operation. In this way, it is possible to reduce the time taken for the step of READ the transfer origin, which makes it possible to increase the processing speed.

Into the fourth embodiment there is provided a processing unit that can carry out a dummy symbol processing by using a CPU block transfer instruction based on a condition discriminant "DE≦HL+(y−x) [byte] (x≠y)" where "HL" represents an initial address of a block transfer origin, "DE" represents an initial address of a block transfer destination, "x [byte]" represents a block transfer data fixed length of an original instruction, and "y [byte]" represents a corresponding bus sizing length. Further, after a data transfer has been ended in the transfer data fixed length of the original instruction based on the condition discrimination, the transfer destination write operation is carried out continuously without returning to the transfer origin read operation. Therefore, it is possible to reduce the time taken for reading the transfer origin, which makes it possible to increase the processing speed.

A fifth embodiment of the invention will be explained with reference to FIG. 8.

FIG. 8 is a connection diagram showing a structure including a latch circuit and a selection circuit.

According to the fifth embodiment, the transfer destination write operation and the write operation in the transfer data fixed length of the original instruction in the first embodiment are processed by the dynamic bus sizing processing.

When the transfer data length of the original instruction x=1 and also when the data length corresponding to the dynamic bus sizing y=2, a circuit structure as shown in FIG. 8 is used. As explained in the second embodiment, only "DE=HL+1" meets the condition discriminant "DE≦HL+ (y−x) [byte] (x≠y)". The transfer problem in this case is shown in FIG. 11.

This problem will be explained with reference to FIG. 8. Legend 20 denotes data on the memory as shown by the initial value of HL. Legend 21 denotes a circuit for latching the data 20, and Legend 23 denotes a selection circuit for selecting normal data 24 and data after latching 22. Legend 25 denotes a control signal of the selection circuit 23. This signal is generated by a decoding circuit. An output 26 of the selection circuit 23 becomes an output of the written data. The data generated here is processed as the final output data in the dynamic bus sizing processing circuit. A result of the processing is output to the external bus. In this way, a block transfer of complete dynamic bus sizing is carried out.

In the fifth embodiment there is provided a processing unit that can carry out a dummy symbol processing by using a CPU block transfer instruction based on a condition discriminant "DE≦HL+(y−x) [byte] (x≠y)" where "HL" represents an initial address of a block transfer origin, "DE" represents an initial address of a block transfer destination, "x [byte]" represents a block transfer data fixed length of an original instruction, and "y [byte]" represents a corresponding bus sizing length. The processing unit can carry out data writing in a transfer data length of an original instruction in an execution flow under the condition and that can carry out a processing corresponding to dynamic bus sizing in other execution flows. Further, a CPU main decoding circuit has a discrimination circuit of the condition discriminant "DE≦HL+(y−x) [byte] (x≠y)", and the CPU has a discriminating unit that carries out a discrimination in a CPU decoding cycle. The CPU further includes a latching unit that latches data for the purpose of carrying out a dynamic bus sizing processing and a selecting unit that uses latched data based on a result of a discrimination carried out according to the condition discriminant "DE≦HL+(y−x) [byte] (x≠y)". Therefore, it is possible to obtain the high-speed block transfer circuit in dynamic bus sizing that can process the transfer destination write operation and the write operation in the transfer data fixed length of the original instruction by the dynamic bus sizing processing, that can suitably execute the processing at high speed using the condition discriminant "DE≦HL+(y−x) [byte] (x≠y)", that can carry out a block transfer in a data length larger than the block transfer data fixed length of the original instruction and that can carry out the dynamic bus sizing processing.

A sixth embodiment of the invention will be explained with reference to FIG. 9.

Figure 9:
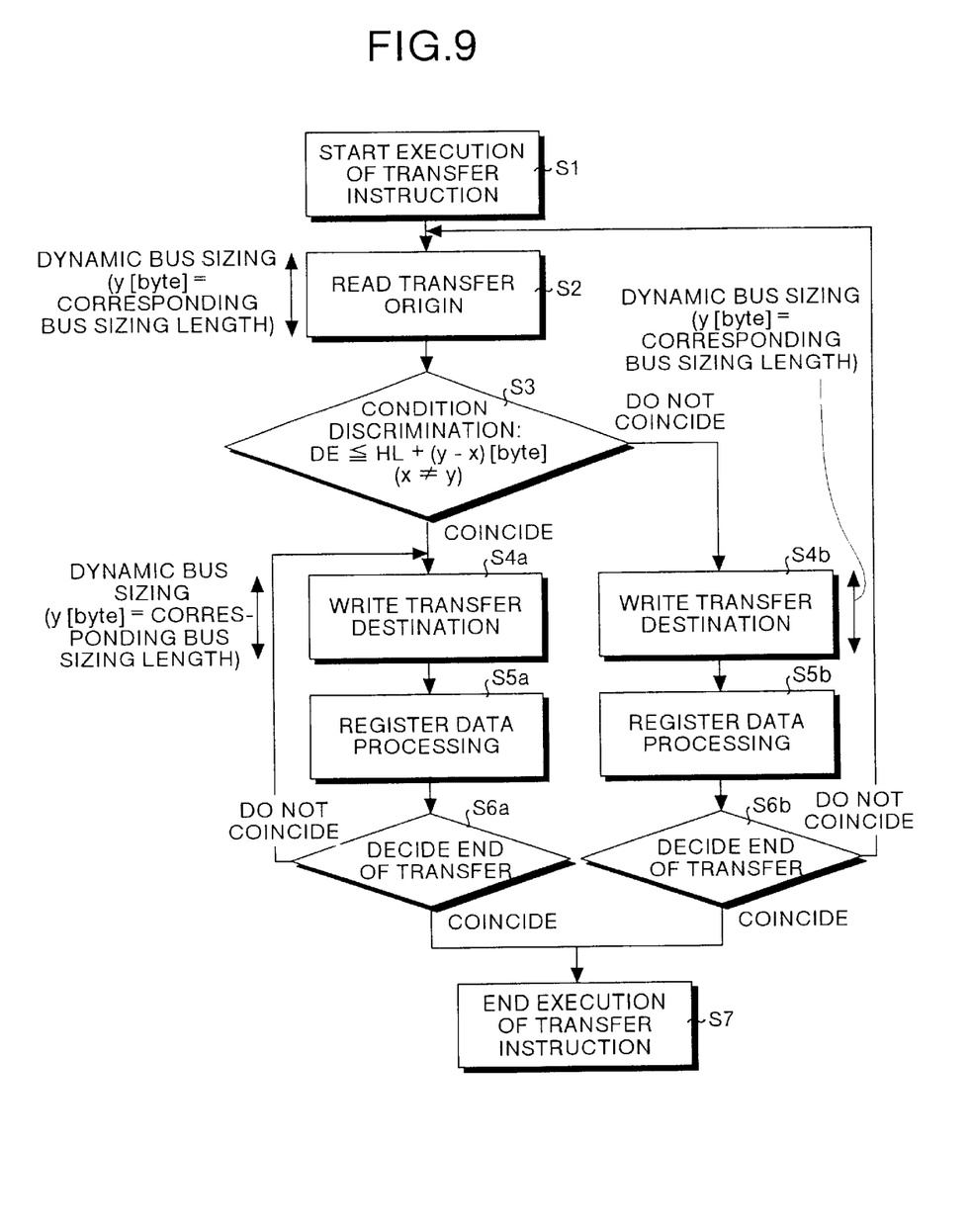
FIG. 9 is a flowchart showing a sequence for executing a block transfer instruction according to a sixth embodiment of the invention.

FIG. 9 shows a sequence of operations when the block transfer instruction is executed.

According to the sixth embodiment, the execution flow that meets the condition discriminant "DE≦HL+(y−x) [byte] (x≠y)" in the fifth embodiment is carried out in a reduced flow. In the execution flow similar to that of the fourth embodiment, the time taken for the step of READ the transfer origin is reduced, which makes it possible to increase the processing speed.

In the sixth embodiment there is provided a processing unit that can carry out a dummy symbol processing by using a CPU block transfer instruction based on a condition discriminant "DE≦HL+(y−x) [byte] (x≠y)" where "HL" represents an initial address of a block transfer origin, "DE" represents an initial address of a block transfer destination, "x [byte]" represents a block transfer data fixed length of an original instruction, and "y [byte]" represents a corresponding bus sizing length. The processing unit can carry out data writing in a transfer data length of an original instruction in an execution flow under the condition and that can carry out a processing corresponding to dynamic bus sizing in other execution flows. Further, a CPU main decoding circuit has a discrimination circuit of the condition discriminant "DE≦HL+(y−x) [byte] (x≠y)", and the CPU has a discriminating unit that carries out a discrimination in a CPU decoding cycle. The CPU further includes a latching unit that latches data for the purpose of carrying out a dynamic bus sizing processing and a selecting unit that uses latched data based on a result of a discrimination carried out according to the condition discriminant "DE≦HL+(y−x) [byte] (x≠y)". Further, the transfer destination is written following the transfer by the dynamic bus sizing processing based on the condition discrimination. Therefore, it is possible to obtain the high-speed block transfer circuit in dynamic bus sizing that can process at high speed the transfer destination write operation and the write operation in the transfer data fixed length of the original instruction by the dynamic bus sizing processing, that can suitably execute the processing at high speed using the condition discriminant "DE≦HL+(y−x) [byte] (x≠y)", that can carry out a block transfer in a data length larger than the block transfer data fixed length of the original instruction and that can carry out the dynamic bus sizing processing.

According to the present invention, there is provided a processing unit that can carry out a dynamic bus sizing processing and that can carry out a dummy symbol processing by using a CPU block transfer instruction in a CPU equipped with an instruction to be carried out based on the block transfer instruction. Therefore, it is possible to obtain the high-speed block transfer circuit in dynamic bus sizing that can carry out a block transfer in a data length larger than the block transfer data fixed length of the original instruction and that can carry out the dynamic bus sizing processing.

Further, there is provided the high-speed block transfer circuit in dynamic bus sizing of the first aspect, wherein the high-speed block transfer circuit comprises a processing unit that can carry out a dummy symbol processing by using a CPU block transfer instruction based on a condition discriminant "DE≦HL+(y−x) [byte] (x≠y)" where "HL" represents an initial address of a block transfer origin, "DE" represents an initial address of a block transfer destination, "x [byte]" represents a block transfer data fixed length of an original instruction, and "y [byte]" represents a corresponding bus sizing length. Therefore, it is possible to obtain the high-speed block transfer circuit in dynamic bus sizing that can execute a processing based on the condition discriminant "DE≦HL+(y−x) [byte] (x≠y)", that can carry out a block transfer in a data length larger than the block transfer data fixed length of the original instruction and that can carry out the dynamic bus sizing processing.

Further, there is provided the high-speed block transfer circuit in dynamic bus sizing of the second aspect, wherein a CPU main decoding circuit has a discrimination circuit of the condition discriminant "DE≦HL+(y−x) [byte] (x≠y)", and the CPU has a discriminating unit that carries out a discrimination in a CPU decoding cycle. Therefore, it is possible to obtain the high-speed block transfer circuit in dynamic bus sizing that can suitably and easily execute a processing based on the condition discriminant "DE≦HL+(y−x) [byte] (x≠y)", that can carry out a block transfer in a data length larger than the block transfer data fixed length of the original instruction and that can carry out the dynamic bus sizing processing.

Further, the CPU includes a latching unit that latches data for the purpose of carrying out a dynamic bus sizing processing and a selecting unit that uses latched data based on a result of a discrimination carried out according to the condition discriminant "DE≦HL+(y−x) [byte] (x≠y)". Therefore, it is possible to obtain the high-speed block transfer circuit in dynamic bus sizing that can suitably and easily execute a processing based on the condition discriminant "DE≦HL+(y−x) [byte](x≠y)" by the latching and selection of data, that can carry out a block transfer in a data length larger than the block transfer data fixed length of the original instruction and that can carry out the dynamic bus sizing processing.

Further, there is provided a processing unit that can carry out data writing in a transfer data length of an original instruction in an execution flow under the condition and that can carry out a processing corresponding to dynamic bus sizing in other execution flows. Therefore, it is possible to obtain the high-speed block transfer circuit in dynamic bus sizing that can suitably carry out a block transfer in a data length larger than the block transfer data fixed length of the original instruction and that can carry out the dynamic bus sizing processing.

Further, a CPU main decoding circuit has a discrimination circuit of the condition discriminant "DE≦HL+(y−x) [byte] (x≠y)", and the CPU has a discriminating unit that carries out a discrimination in a CPU decoding cycle. Therefore, it is possible to obtain the high-speed block transfer circuit in dynamic bus sizing that can suitably and easily carry out a block transfer in a data length larger than the block transfer data fixed length of the original instruction and that can carry out the dynamic bus sizing processing.

Further, a condition discrimination is carried out in the same cycle as that of the decoding. Therefore, it is possible to obtain the high-speed block transfer circuit in dynamic bus sizing that can suitably execute a processing at high speed based on the condition discriminant "DE≦HL+(y−x) [byte] (x≠y)", that can carry out a block transfer in a data length larger than the block transfer data fixed length of the original instruction and that can carry out the dynamic bus sizing processing.

Further, a transfer destination write operation is carried out following a transfer in the transfer data fixed length of the original instruction based on a condition discrimination. Therefore, it is possible to obtain the high-speed block transfer circuit in dynamic bus sizing that can process at high speed by reducing the time required for reading the transfer origin, that can carry out a block transfer in a data length larger than the block transfer data fixed length of the original instruction and that can carry out the dynamic bus sizing processing.

Further, the CPU includes a latching unit that latches data for the purpose of carrying out a dynamic bus sizing processing and a selecting unit that uses latched data based on a result of a discrimination carried out according to the condition discriminant "DE≦HL+(y−x) [byte] (x≠y)". Therefore, it is possible to obtain the high-speed block transfer circuit in dynamic bus sizing that can process the transfer destination write operation and the write operation in the transfer data fixed length of the original instruction by the dynamic bus sizing processing, that can suitably execute the processing at high speed using the condition discriminant "DE≦HL+(y−x) [byte] (x≠y)", that can carry out a block transfer in a data length larger than the block transfer data fixed length of the original instruction and that can carry out the dynamic bus sizing processing.

Further, a transfer destination write operation is carried out following a dynamic bus sizing processing based on a condition discrimination. Therefore, it is possible to obtain the high-speed block transfer circuit in dynamic bus sizing that can process at high speed the transfer destination write operation and the write operation in the transfer data fixed length of the original instruction by the dynamic bus sizing processing, that can suitably execute the processing at high speed using the condition discriminant "DE≦HL+(y−x) [byte] (x≠y)", that can carry out a block transfer in a data length larger than the block transfer data fixed length of the original instruction and that can carry out the dynamic bus sizing processing.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A high-speed block transfer circuit for dynamic bus sizing, comprising a processing unit for dynamic bus sizing processing and dummy symbol processing using a CPU block transfer instruction based on a condition discriminant "DE≦HL+(y−x) [byte] (x≠y)" where "HL" represents an initial address of a block transfer origin, "DE" represents an initial address of a block transfer destination, "x [byte]" represents a block transfer data fixed length of an original instruction, and "y [byte]" represents a corresponding bus width.

2. The high-speed block transfer circuit according to claim 1, wherein a CPU main decoding circuit has a discrimination circuit for the condition discriminant "DE≦HL+(y−x) [byte] (x≠y)", and the CPU has a discriminating unit that carries out a discrimination in a CPU decoding cycle.

3. The high-speed block transfer circuit according to claim 1 comprising a processing unit that can carry out data writing in a transfer data length of an original instruction in an execution flow under the condition discriminant and that can carry out processing corresponding to dynamic bus sizing in other execution flows.

4. The high-speed block transfer circuit according to claim 1, wherein a condition discrimination is carried out in the same cycle as decoding.

5. The high-speed block transfer circuit according to claim 1, wherein a transfer destination write operation is carried out following a transfer in the transfer data fixed length of the original instruction based on a condition discrimination.

6. The high-speed block transfer circuit according to claim 2, wherein the CPU includes a latching unit that latches data for the dynamic bus sizing processing and a selection unit that uses latched data based on a result of a discrimination carried out according to the condition discriminant "DE≦HL+(y−x) [byte] (x≠y)".

7. The high-speed block transfer circuit according to claim 3, wherein a CPU main decoding circuit has a discrimination circuit for the condition discriminant "DE≦HL+(y−x) [byte] (x≠y)", and the CPU has a discriminating unit that carries out a discrimination in a CPU decoding cycle.

8. The high-speed block transfer circuit according to claim 7, wherein the CPU includes a latching unit that latches data for the dynamic bus sizing processing and a selection unit that uses latched data based on a result of a discrimination carried out according to the condition discriminant "DE≦HL+(y−x) [byte] (x≠y)".

9. The high-speed block transfer circuit according to claim 8, wherein a transfer destination write operation is carried out following the dynamic bus sizing processing, based on a condition discrimination.

* * * * *